W. H. FRANCIS.
WATER HEATER.
APPLICATION FILED MAR. 29, 1919.
1,315,296.
Patented Sept. 9, 1919.
2 SHEETS—SHEET 1.
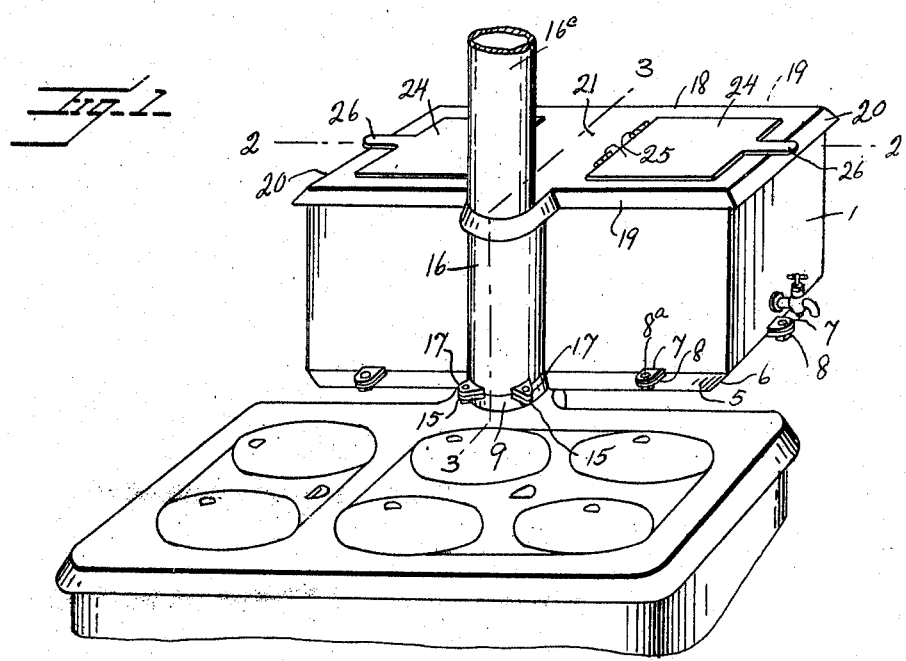
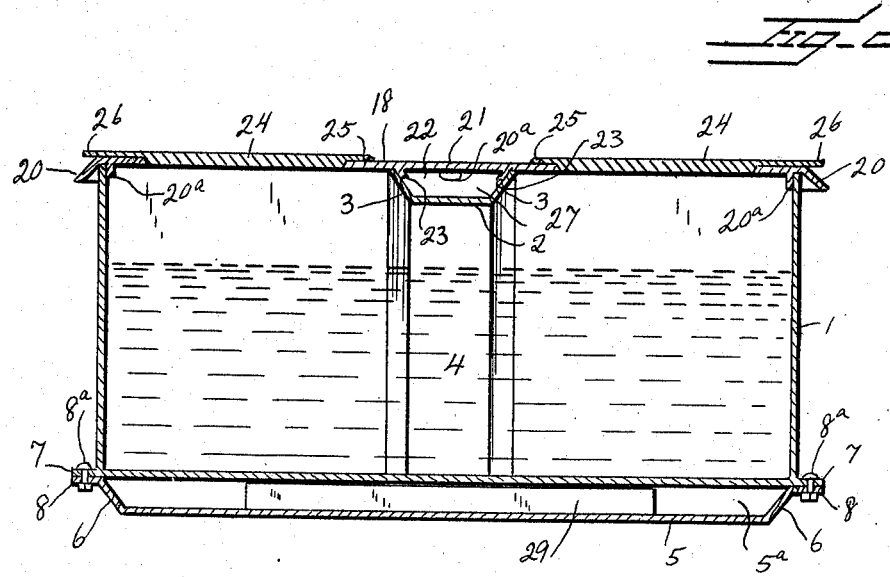
Inventor
W. H. Francis
By Watson E. Coleman
Attorney

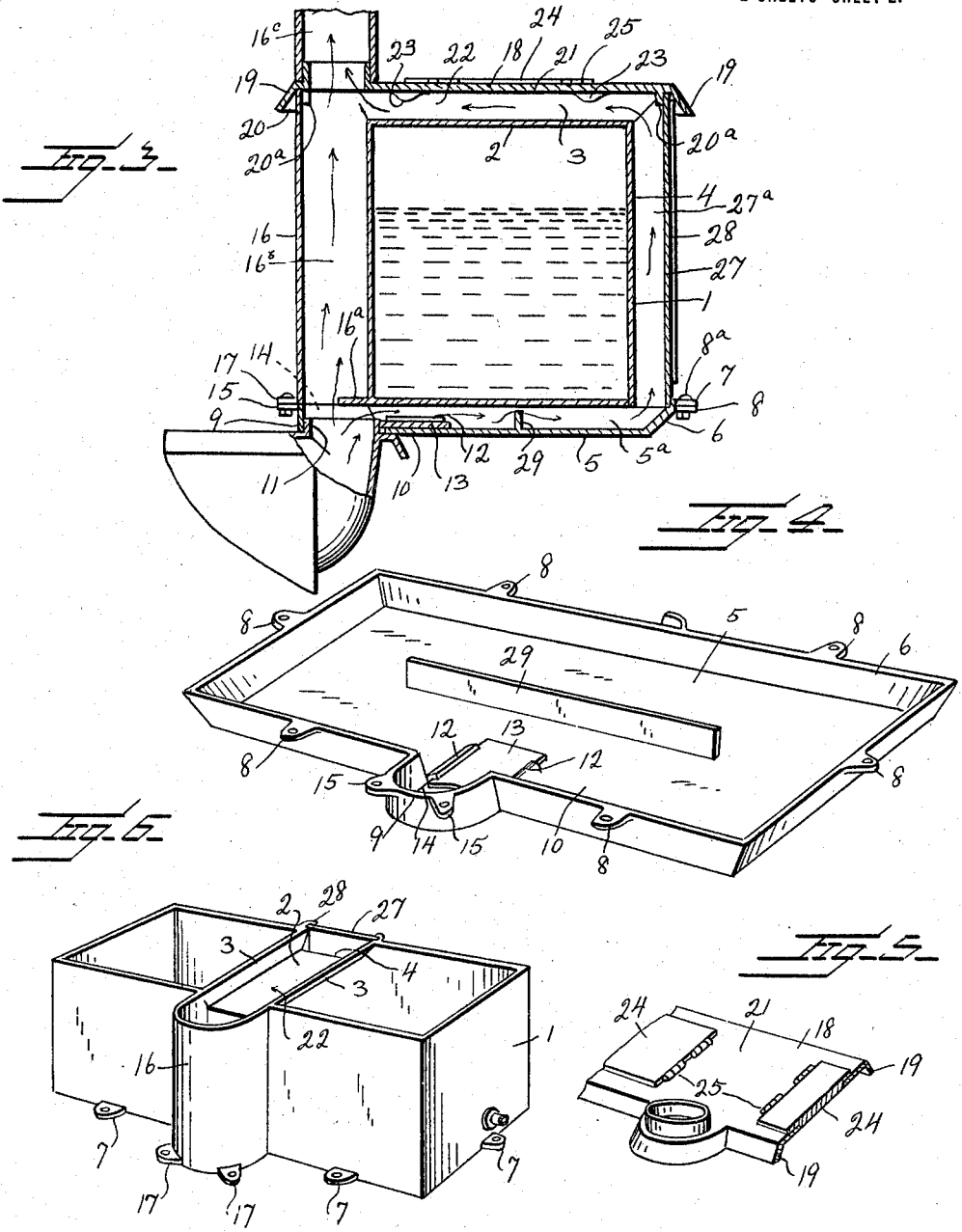

UNITED STATES PATENT OFFICE.

WILLIAM H. FRANCIS, OF GALLIPOLIS, OHIO, ASSIGNOR OF ONE-THIRD TO CHARLES JEFFERSON FRANCIS, OF GALLIPOLIS, OHIO.

WATER-HEATER.

1,315,296.   Specification of Letters Patent.   Patented Sept. 9, 1919.

Application filed March 29, 1919. Serial No. 286,198.

*To all whom it may concern:*

Be it known that I, WILLIAM H. FRANCIS, a citizen of the United States, residing at Gallipolis, in the county of Gallia and State of Ohio, have invented certain new and useful Improvements in Water-Heaters, of which the following is a specification, reference being had to the accompanying drawings.

This invention relates to a reservoir or water heater, adapted particularly for use in connection with cooking stoves and the like.

The invention aims to provide a water reservoir or heater having means so provided as to enable the reservoir or heater to be connected to the smoke flue (which carries off the products of combustion) of the cooking stove, in such wise as to derive considerable heat from the flue, for the purpose of heating the water in the reservoir, it being obvious that the water may be used for various purposes.

The invention further aims to provide a reservoir, simple and efficient in construction and practical in use, and may be manufactured for small cost and sold at reasonable profit.

The invention further aims to afford a reservoir or heater including supporting means for the reservoir, whereby it may be supported in a superimposed spaced relation to the supporting means, to provide a heating flue under the entire surface of the reservoir, it being obvious that the heat may readily radiate the full area of the bottom of the reservoir and heat the water in the reservoir.

The invention further aims to provide a back flue (which is in communication with the bottom flue), and a top flue in communication with the back flue, whereby the heat, which accumulates in the bottom flue, may pass to the rear and the top, while supplying heat to the reservoir for heating the water.

The invention further aims to provide means carried by the supporting member for engagement with the collar at the base of the smoke flue, to insure a firm and close fitting connection with the smoke flue of the cooking stove, in order to prevent displacement of the reservoir.

While the design and construction now illustrated is deemed preferable, it is obvious that the same is susceptible to changes, particularly when reducing the invention to a practical form for commercial purposes. The right to these changes is claimed, provided they fall within the scope of what is claimed.

The invention comprises further features and combination of parts, hereinafter set forth, shown in the drawings, and claimed.

In the drawings:

Figure 1 is a perspective view of the improved reservoir or heater as applied to a cooking stove.

Fig. 2 is a longitudinal sectional view on line 2—2 of Fig. 1.

Fig. 3 is a transverse sectional view on line 3—3 of Fig. 1.

Fig. 4 is a detail perspective view of the supporting base for the reservoir or heater proper, illustrating means for connecting the base to the collar of the cooking stove.

Fig. 5 is a detail view of the top of the reservoir.

Fig. 6 is a detail view of the main body of the reservoir or heater disconnected from the other members thereof.

Referring more especially to the drawings 1 designates the main body of the reservoir, which may be constructed of any suitable cast metal, and may be of any convenient shape or configuration, preferably such as that illustrated.

This body in the present instance is rectangular, and its upper portion upon each side of the center is open, in order to permit the entrance of water to be used.

However, the central part of the upper portion of the body is provided with a transversely disposed plate 2, which is dished, the side flanges 3 of the central plate inclining upwardly and laterally. It is obvious that when this centrally disposed plate is covered, as will be hereinafter set forth, a heating flue will be constructed. The rear wall of the body of the reservoir is likewise dished as shown at 4, therefore providing a back flue, as will be hereinafter stated, and which is contiguous with the top flue, whereby the heat may pass from one to the other.

The body of the reservoir is supported by a base member 5, which is provided with a marginal flange 6 inclined upwardly and inwardly. This marginal flange supports the body of the reservoir, there being registering ears 7 and 8 carried by the body and the end parts of the marginal flange 6, for the reception of securing bolts 8ª, whereby the base or support may be connected to the body of the reservoir. Obviously a rigid structure is afforded. The front portion of the marginal flange 6 of the base 5 is provided with an outwardly curved U-shaped portion 9. However, where the U-shaped portion 9 is formed, (there being an adjoining bottom 10 forming an integral part of the U-shaped portion 9) an opening is formed in the bottom for the reception of the base collar or flange 11 at the rear of the cooking stove. The bottom 10 adjacent the U-shaped portion 9 is provided with guides 12, for the reception of a sliding plate 13. It is clear that when the slide 13 is inserted in its guides, its forward edge may contact with the collar 11ª of the cooking stove, thereby aid in holding the base securely in position. The opening 14 in the bottom of the U-shaped portion 9 may be circular, and of such diameter as to receive the maximum size of smoke flue of cooking stoves. Some smoke flues are cylindrical and others are elliptical in cross-section, and obviously by virtue of the sliding plate, the supporting base plate may be easily connected to a cylindrical or elliptical shaped smoke flue. The outer marginal edges of the U-shaped portion 9 of the flange 6 is supplied with lateral ears 15. The front wall of the body of the reservoir is provided with a forwardly bulged U-shaped part 16, which conforms in contour with the outer marginal edge of the U-shaped portion 9. The lower edge of the U-shaped part 16 is supplied with ears 17, which register with the ears 15, for the reception of suitable securing bolts, so as to join the U-shaped portions 9 and 16 together. A cover frame 18 is illustrated and it is to be noted that the side and end pieces 19 and 20 of this frame are inclined downwardly and outwardly, so as to engage the upper marginal corner edge of the body of the reservoir, there being lugs 20ª carried by the frame partially engaging the upper end openings of the body of the reservoir to hold the frame in place. This frame 18 has a transverse centrally disposed piece 21, which when the frame 18 is in position on the body of the reservoir, covers the dished central piece 2 of the body, thereby providing a top heating flue 22, heretofore mentioned. Depending from the opposite edges of the transverse central piece 21 of the frame 18 are lugs 23, engaging the opposite edges of the inclined flanges 3 of the central piece 2 of the body, in order to insure holding the frame 18 rigidly adjoining the body of the reservoir. Closure members 24 are hingedly connected at 25 to the opposite edges of the central piece 21, for closing the upper openings to the interior of the body of the reservoir. Lugs 26 are formed on the outer ends of the closures, to overlie the end pieces 20 of the frame 18. These lugs may be grasped, permitting the closures to be raised so as to fill the reservoir. A slide plate 27 engages guides 28 on the marginal corner edges of the beveled walls of the dished part 4 of the rear wall of the body of the reservoir, and since the upper and lower edges of the slide plate are engaged by the top frame 18 and the supporting base, the slide plate 27 is prevented from displacement, and furthermore a rear heating flue is devised which is in communication with the top and bottom flues of the reservoir, permitting a thorough circulation of the heat from the bottom flue to the top flue. Rising upwardly from the bottom of the supporting plate is a fin 29 constituting a deflector, acting to deflect the heat to the opposite ends of the bottom flue 5ª, so that the heat may radiate against the entire bottom of the reservoir, consequently thoroughly heating the water therein. The U-shaped portion 16 forms a front vertical flue 16ᵇ, which as the drawing illustrates, is in communication with the bottom flue 5ª. The bottom flue is in communication with the rear flue 27ª, which in turn is in communication with the top heating flue 22. By these various flues, it is to be noted that the central portion of the body or reservoir is entirely surrounded by heat, which is derived from products of combustion. In other words, the products of combustion from the back flue of the stove are divided, a portion ascending through the flue 16ᵇ and the other portion is deflected by the deflector 16ª, causing the latter portion to pass through the flues 5ª, 27ª and 22, and then uniting with the former portion of the products of combustion and passing out through the flue 16ᶜ. In order to support the reservoir in position, it will be noted that the base member has the U-shaped portion 9 of the flange of the base member engaging the flanged outlet of the smoke flue of the stove, and moreover, the sliding plate 13 which is mounted in the guides 12 frictionally is designed to clamp against the flange of the outlet of the smoke flue of the stove, thereby assisting in supporting the reservoir in position. Furthermore, owing to the smoke flue 16ᶜ engaging the marginal flanged opening at the forward portion of the frame 18, the reservoir is additionally supported in position. The lugs or parts 20ª of the frame 18 engage within the front, back and top flues of the reservoir, and some of such lugs 20ª engage with the inner surfaces of the end walls of the reservoir, thereby preventing movement of the top frame. In order to additionally support and reinforce the reservoir in position, the smoke flue 16ᶜ may extend upwardly from the stove or range and then toward the wall at the back of the stove and may be communicatively connected with the chimney, and in which case the flue 21° is partially reinforced and supported in position. However, a suitable brace (not shown) may be interposed between the smoke flue 21° and the wall of the chimney in order to additionally brace it in position, so as to assist in supporting the reservoir. If desired, any suitable supporting means (not shown) may be interposed between the base member and the floor, that is at the rear of the reservoir, to insure supporting the reservoir in place. These features of supporting the reservoir are not particularly essential, since it is obvious that any suitable additional supporting means (not shown) may be employed to reinforce the heater in place.

The invention having been set forth, what is claimed as new and useful is:

1. In a water heating reservoir, having a water receiving chamber and provided with means for connecting the reservoir to the smoke flue of a cooking stove, of a bottom heating flue extending the full area of the bottom of the reservoir, and top and back flues communicatively joined, the back flue being in communication with the bottom flue, whereby heat may pass from the bottom flue to the back and top of the reservoir, said back and top flues being formed centrally in the back and top walls of the reservoir.

2. In a water heating reservoir, the combination with a reservoir body, of a marginal flange supporting base therefor, said body on either side of the central portion of its top being open, a cover frame provided with closures for said openings, the top of the body at its central part being dished to provide a top flue, the back of the body being dished to provide a back flue communicatively joining the top flue, a bottom flue between the body and the supporting base communicatively connecting the back flue, and means for connecting the reservoir to the smoke flue of a cooking stove, and a deflector in the bottom flue.

3. In a water heating reservoir, the combination with a reservoir body provided with centrally disposed back and top flues, of a supporting base for the body, a bottom flue extending the full area of the bottom of the reservoir body and in communicative connection with the back flue, means for connecting and supporting the reservoir on the smoke flue of a cooking stove, and a deflector in the bottom of the flue.

4. In a water heating reservoir, the combination with a supporting base provided with means for connecting the base to smoke flues of various shapes, of a reservoir body support on the base and having means to engage the smoke flue, a cover frame for the reservoir body and provided with means to engage the smoke flue, a bottom flue extending the full area of the bottom of the reservoir and merging in a restricted flue at the rear and top of the body of the reservoir, the top of the body of the reservoir having entrance openings upon either side of the top heating flue, closures hingedly connected to the cover frame and adapted for closing said entrance openings, means for fastening the supporting base and the reservoir body and the cover frame rigidly together, and a deflector in the supporting base.

5. In a water heating reservoir, the combination with a reservoir base, which is dished and provided with a marginal flange, the flange thereof having a semi-circular loop adjacent one of the longitudinal sides of the base to receive and engage the flange of the smoke flue of the stove, said base having guides, of a slide frictionally mounted in the guides and adapted to be moved to clamp against the flange of the smoke flue of the stove, a reservoir body mounted upon the base, said base having a centrally disposed upstanding fin, thereby dividing the base into a pair of flues, the rear and top walls of the reservoir body being dished, the rear wall vertically, and the top wall transversely, thereby forming back and top flues communicatively connected, the back flue being communicatively connected with the flues of the base, the front wall of the reservoir having a vertical flue communicatively connected with the smoke flue of the stove and the flues of the base and the top flue, and a cover plate for the reservoir body.

6. In a water heating reservoir, the combination with a base being dished and having means to engage the flange of the smoke flue of the stove and provided with additional means to clamp against the flange of the smoke flue of the stove, of a reservoir body secured upon the base and having front, back and top flues communicatively connected, the back flue being communicatively connected with the hollow of the base, the front flue being communicatively connected with the hollow of the base and the smoke flue of the stove, and a cover frame for the reservoir body.

7. In a water heating reservoir, the combination with a stove having a smoke flue provided with a flanged outlet, of a water reservoir clamped upon the flanged outlet and comprising a base and a reservoir body, the base being dished and provided with a central fin, thereby forming base flues extending the full area of the bottom of the reservoir body and being communicatively connected with the smoke flue of the stove, the front and back walls of the reservoir body having vertical flues, the forward one of which is communicatively connected with the smoke flue of the stove and the flues of the base, the back flues of the reservoir body being communicatively connected with the flues of the base, the top wall of the reservoir body having a top flue communicatively connecting the front and back flues of the body, and a cover frame for the reservoir body.

8. In a water heating reservoir, the combination with a stove having a smoke flue having a flanged outlet, of a reservoir detachably clamped to the flanged outlet, the back wall of the reservoir being dished vertically and centrally thereof, the walls of the dished portion having guides, a sliding member in said guides, thereby closing the dished portion and forming a back flue, the top wall of the reservoir being dished centrally from the front toward the back and communicatively connected with the dished portion at the back, a cover plate on the top of the reservoir extending across the top dished portion, thereby forming a top flue, front wall of the reservoir having a front flue communicatively connected with the top flue, said reservoir having a base provided with flues extending the full area of the bottom, and communicatively connecting the front and back flues, the lower part of the front flue having a deflector, whereby parts of the products of combustion from the smoke flue of the stove are deflected through the flues of the base.

In testimony whereof I hereunto affix my signature in the presence of two witnesses.

WILLIAM H. FRANCIS.

Witnesses:
  M. S. WHITE,
  R. P. THOMPSON.

Copies of this patent may be obtained for five cents each, by addressing the "Commissioner of Patents, Washington, D. C."